(12) United States Patent
Matsumoto

(10) Patent No.: US 12,542,171 B2
(45) Date of Patent: Feb. 3, 2026

(54) POWER SUPPLY CONTROL CIRCUIT AND MEMORY SYSTEM

(71) Applicant: Kioxia Corporation, Tokyo (JP)

(72) Inventor: Hajime Matsumoto, Tokyo (JP)

(73) Assignee: Kioxia Corporation, Tokyo (JP)

( * ) Notice: Subject to any disclaimer, the term of this patent is extended or adjusted under 35 U.S.C. 154(b) by 85 days.

(21) Appl. No.: 18/459,314

(22) Filed: Aug. 31, 2023

(65) Prior Publication Data

US 2024/0087638 A1 Mar. 14, 2024

(30) Foreign Application Priority Data

Sep. 14, 2022 (JP) ................................. 2022-146276

(51) Int. Cl.
*G11C 11/4074* (2006.01)
*G11C 11/4076* (2006.01)
*G11C 11/4096* (2006.01)

(52) U.S. Cl.
CPC ...... *G11C 11/4074* (2013.01); *G11C 11/4076* (2013.01); *G11C 11/4096* (2013.01)

(58) Field of Classification Search
CPC ............ G11C 11/4074; G11C 11/4076; G11C 11/4096; G11C 16/30; G11C 16/32; G11C 16/0483; G11C 5/147; G06F 1/26
USPC .......................................................... 365/226
See application file for complete search history.

(56) References Cited

U.S. PATENT DOCUMENTS

| | | | |
|---|---|---|---|
| 7,635,968 B2* | 12/2009 | McDonald | G05F 5/00 323/283 |
| 7,675,279 B2 | 3/2010 | Okamoto et al. | |
| 8,624,569 B2 | 1/2014 | Heng | |
| 9,755,508 B2 | 9/2017 | Sugahara | |
| 2018/0046390 A1 | 2/2018 | Matsumoto et al. | |
| 2018/0286465 A1 | 10/2018 | Eguchi et al. | |
| 2023/0067195 A1 | 3/2023 | Matsumoto | |

* cited by examiner

*Primary Examiner* — Huan Hoang
(74) *Attorney, Agent, or Firm* — Kim & Stewart LLP

(57) ABSTRACT

A power supply circuit includes an input circuit configured to receive a supply of an input voltage, an output circuit configured to output at least one first output voltage based on the input voltage, and a power supply control circuit configured to control the output circuit so as to change an output start timing of the first output voltage according to a length of a time period during which the input voltage changes from a first voltage to a second voltage.

20 Claims, 8 Drawing Sheets

POWER SUPPLY CONTROL CIRCUIT AND MEMORY SYSTEM

CROSS-REFERENCE TO RELATED APPLICATION(S)

This application is based upon and claims the benefit of priority from Japanese Patent Application No. 2022-146276, filed Sep. 14, 2022, the entire contents of which are incorporated herein by reference.

FIELD

Embodiments described herein relate generally to a power supply control circuit and a memory system.

BACKGROUND

A memory system is provided in which power is supplied from a host, and a power supply circuit including a power supply IC supplies power (voltage) to a controller, a NAND memory, and the like.

DETAILED DESCRIPTION

Figure 1:
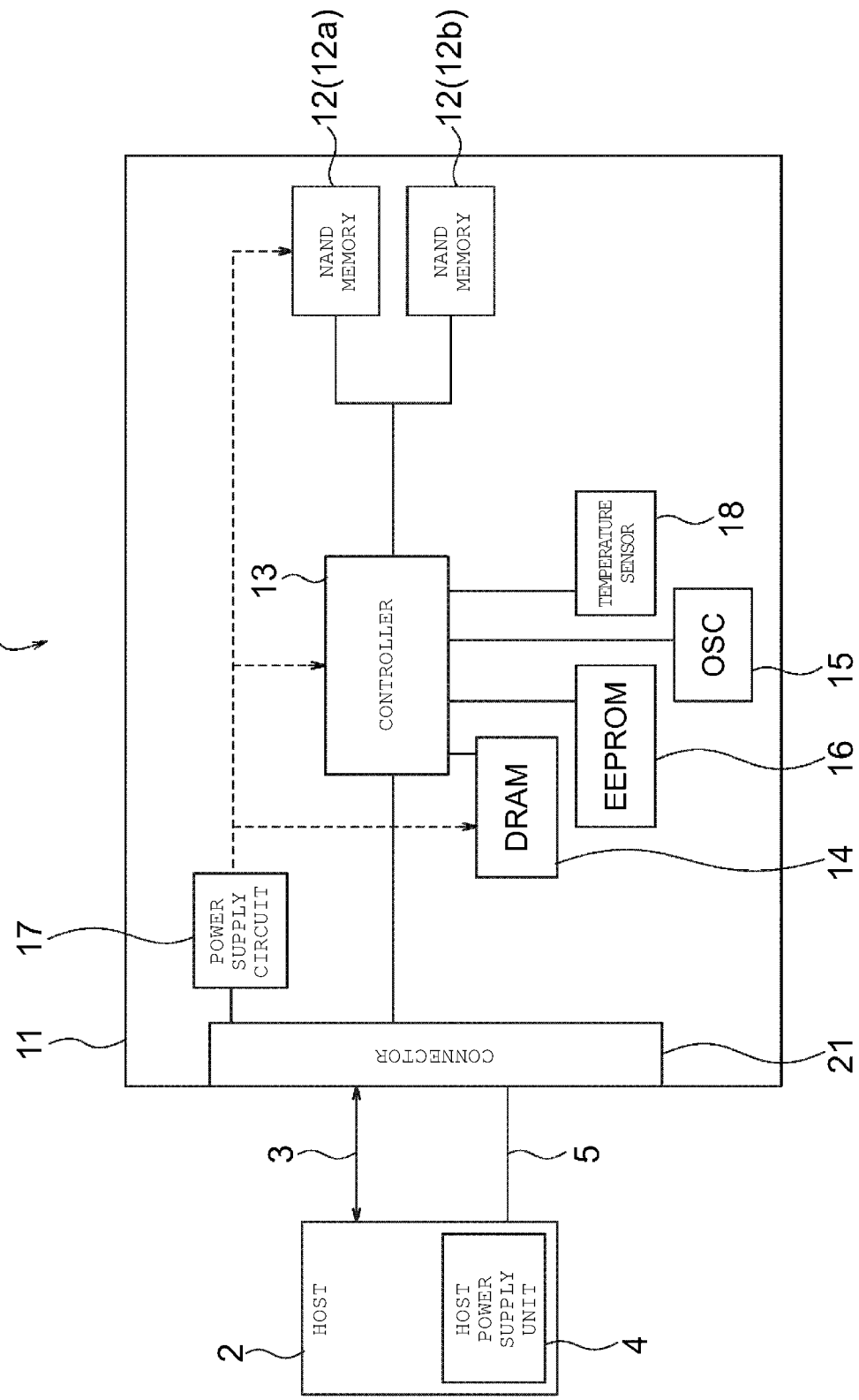
FIG. 1 is a diagram showing an example of a system configuration of a memory system according to a first embodiment.

Embodiments provide a power supply control circuit and a memory system capable of supplying power more appropriately.

In general, according to one embodiment, the power supply circuit includes an input circuit configured to receive a supply of an input voltage, an output circuit configured to output at least one first output voltage based on the input voltage, and a power supply control circuit configured to control the output circuit so as to change an output start timing of the first output voltage according to a length of a time period during which the input voltage changes from a first voltage to a second voltage.

Hereinafter, embodiments according to the present disclosure will be described with reference to the drawings. The embodiments do not limit the scope of the present disclosure. The drawings are schematic or conceptual, and the ratio or the like of each part is not necessarily the same as the actual one. In the specification and drawings, the same reference numerals are given to the same elements with respect to the previous drawings, and detailed description thereof will be omitted as appropriate.

In this specification, several elements are accompanied by examples of multiple expressions. It should be noted that these are merely examples of expressions, and the above elements may be expressed differently. In addition, elements that are not accompanies by multiple expressions may also be expressed differently.

Moreover, the drawings are schematic, and a relationship between the thickness and the planar dimensions, a ratio of the thickness of each layer, and the like may differ from the actual ones. In addition, the drawings may include portions with different dimensional relationships and ratios.

First Embodiment

FIG. 1 shows an example of a system configuration of a memory system 1 according to a first embodiment. The memory system according to the present embodiment is, for example, a memory system such as a solid state drive (SSD), but is not limited to this.

As shown in FIG. 1, the memory system 1 is connected to a host 2. In the present embodiment, the host 2 is various electronic devices such as a notebook portable computer, a tablet terminal, another detachable notebook PC, and a mobile phone. In addition, the host 2 may be a server device used in a data center or the like. The memory system 1 may be used, for example, as an external memory for these hosts 2.

As shown in FIG. 1, the memory system 1 includes a substrate 11, a nonvolatile memory 12, a controller 13, a volatile memory 14 capable of operating at a higher speed than the nonvolatile memory 12, an oscillator (OSC) 15, an electrically erasable and programmable ROM (EEPROM) 16, a power supply circuit 17, a temperature sensor 18, and a connector 21. The memory system 1 also includes other electronic components such as resistors and capacitors.

The nonvolatile memory 12 is, for example, a NAND flash memory (hereinafter abbreviated as NAND memory). In the following description, the nonvolatile memory 12 will be described as "NAND memory 12", but the nonvolatile memory 12 is not limited to this, and may be another nonvolatile memory such as a magnetoresistive random access memory (MRAM).

The volatile memory 14 is, for example, a dynamic random access memory (DRAM). In the following description, the volatile memory 14 is described as "DRAM 14", but the volatile memory 14 is not limited to this, and may be another volatile memory.

The NAND memory 12 and the controller 13 of the present embodiment are mounted as semiconductor packages which are electronic components. For example, in the semiconductor package of the NAND memory 12, a plurality of semiconductor chips (also referred to herein as memory chips) are stacked and sealed in one package.

The substrate 11 is, for example, a substantially rectangular circuit board made of a material such as glass epoxy resin.

The connector 21 is also called an interface unit, a board interface unit, a terminal unit, or a connection unit. The connector 21 has, for example, a plurality of connection terminals 21a, which are metal terminals. The connector 21 is electrically connected to the host 2 and exchanges signals (e.g., control signals and data signals) with the host 2.

The memory system 1 is electrically connected to the host 2 via the interface 3. The host 2 executes data access control for the memory system 1 and, for example, sends write requests, read requests, and erase requests to the memory system 1 to execute writing, reading, and erasing of data in the memory system 1.

The interface 3 according to the present embodiment is, for example, peripheral component interconnect express (PCIe). That is, a high-speed signal (in particular, a high-speed differential signal) conforming to a PCIe standard flows between the connector 21 and the host 2.

Other standards such as a serial attached SCSI (SAS), a serial advanced technology attachment (SATA), a non-volatile memory express (NVMe), and a universal serial bus (USB) may be used for the interface 3.

The memory system 1 is electrically connected to a host power supply unit 4, which is a power supply circuit, via a power line 5. The host power supply unit 4 provides various power supplies used in the memory system 1 via the power line 5 and the connector 21.

The power supply circuit 17 is electrically connected to the host power supply unit 4 via the connector 21 and the power line 5. The power supply circuit 17 supplies power necessary for operation of the memory system 1 from the host power supply unit 4. The power supply circuit 17 supplies power to each electronic component such as the NAND memory 12, the controller 13, and the DRAM 14.

The power supply circuit 17 includes a power supply IC 17a to which electronic components such as resistors, capacitors, and inductors are connected. The power supply IC 17a will be described later. The power supply IC 17a may be referred to herein as a power supply unit, a power supply chip, or a composite power supply control IC, and the power supply IC 17a is, for example, a power management integrated circuit (PMIC).

The power supply IC 17a according to the present embodiment is, for example, a wafer level chip size package (WLCSP) in which at least one chip is packaged (sealed). The power supply IC 17a is not limited to this.

Controller 13 controls an operation of NAND memory 12. That is, the controller 13 controls writing, reading, and erasing of data in the NAND memory 12. The controller 13 may be an SoC, a circuit, or a processor executing firmware.

In addition, the controller 13 has a reset input, and initializes (resets) a state of the controller 13 itself or cancels the reset state according to the input signal, and normally starts up the memory system 1 as a system. A signal used for canceling the reset state is called, for example, POWER ON RESET. In addition, as used herein, the description "putting in the reset state" also includes a case where a state originally in a reset state is kept in the reset state.

The DRAM 14 is an example of the volatile memory, as described above, and is used for storing management information of the NAND memory 12, caching data, and the like. An oscillator 15 supplies an operating signal with a predetermined frequency to the controller 13. The EEPROM 16 stores control programs and the like as fixed information.

A temperature sensor 18 monitors, for example, a temperature of the controller 13. The temperature sensor 18 is mounted, for example, on the substrate 11 near the controller 13, but the position of the temperature sensor 18 is not limited to this. Furthermore, the temperature sensor 18 does not necessarily have to be provided on the substrate 11 and may be provided as a function of the controller 13.

In addition, the temperature sensor 18 measures the temperature around the position where the temperature sensor 18 is mounted, and the temperature measured by the temperature sensor 18 may be referred to as the "temperature of the memory system 1". Further, when the temperature sensor 18 is mounted near the controller 13, the temperature measured by the temperature sensor 18 may be referred to as the "temperature of the controller 13".

Figure 2:
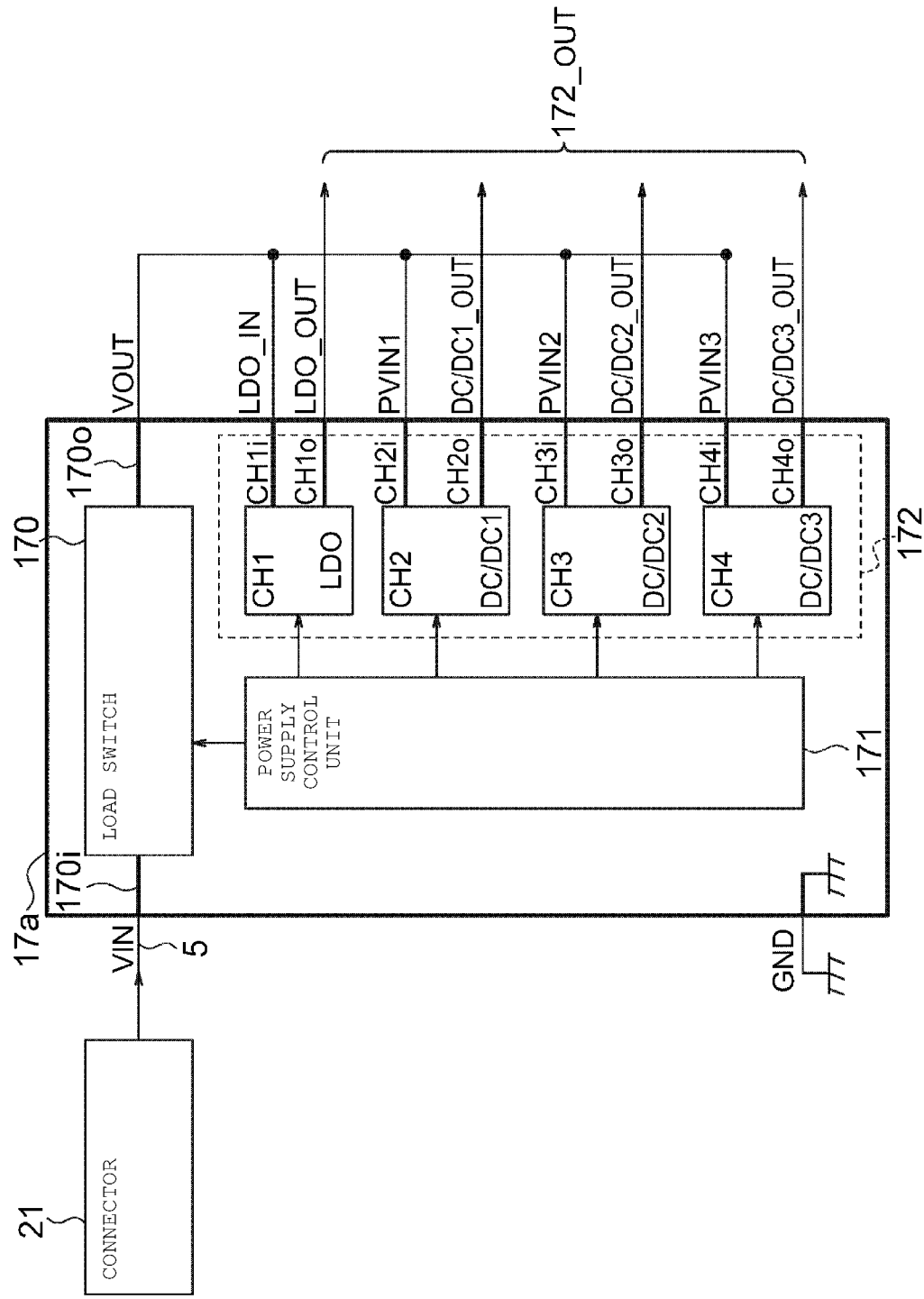
FIG. 2 is a block diagram showing a configuration of a power supply IC according to the first embodiment.

FIG. 2 is a block diagram showing a configuration of the power supply IC 17a according to the present embodiment. In the present embodiment, the power supply IC 17a includes a load switch 170, a power supply control unit 171 (which is a control circuit), and a plurality of power supply channels CH1 to CH4. Each power supply channel may be referred to simply as a power supply. The number of power supply channels is not limited to this.

The power supply IC 17a is supplied with a ground voltage (GND) as a reference voltage. Noise can be reduced by the frame ground.

The load switch 170 is an input circuit that receives an input voltage VIN and generates an output voltage VOUT from the input voltage. The load switch 170 is controlled to be ON state/OFF state by a power supply control unit 171 which will be described later. An input 170i of the load switch 170 is connected to the host 2 (specifically, the host power supply unit 4) via wiring (e.g., wiring layer, internal wiring) provided on the substrate 11, the connector 21 and the power line 5. The input 170i of the load switch 170 is supplied with power (as input voltage VIN) from the host power supply unit 4.

An output 170o of the load switch 170 is electrically connected to inputs CH1i to CH4i of each power supply channel CH via, for example, the outside of the power supply IC 17a. In other words, when the load switch 170 is in the ON state, power is supplied again from the output 170o of the load switch 170 to each power supply channel CH in the power supply IC 17a via the wiring (e.g., wiring layer, internal wiring) provided on the substrate 11.

On the other hand, when the load switch 170 is in the OFF state, the power supply to each power supply channel CH is stopped (cut off, interrupted).

In the present embodiment, the power supply channel CH1 is, for example, a low drop out (LDO). In addition, the power supply channels CH2 to CH4 are, for example, DC/DC converters.

The LDO is a linear regulator that uses the on-resistance of a power device such as a power metal oxide semiconductor field effect transistor (MOSFET) or power transistor to forcibly consume the input power, and is a circuit system that converts the input power to a desired output voltage. The LDO is one that operates as a regulator even when the voltage difference between input and output is small.

In addition, the DC/DC converter is a switching regulator that outputs a switching pulse by switching the input voltage, and operates as a DC power supply by smoothing the output pulse with a filter including an inductor and a coil.

In the present embodiment, an output CH2o of the power supply channel CH2 is connected to the controller 13 and supplies the controller 13 with a predetermined voltage. An output CH3o of the power supply channel CH3 is connected to the DRAM 14 and supplies the DRAM 14 with a predetermined voltage. An output CH4o of the power supply channel CH4 is connected to the NAND memory 12 and supplies the NAND memory 12 with a predetermined voltage. A type and a connection relationship of each power supply channel CH are not limited to those described above and may be changed as appropriate.

The plurality of power supply channels CH1 to CH4 may also be referred to as an output circuit or output units 172 below. The output unit 172 outputs a first output voltage 172_OUT based on the input voltage VIN. More specifically, the output unit 172 receives the supply of the second output voltage VOUT output from the load switch 170 and outputs the first output voltage 172_OUT.

The power supply control unit 171 performs a power output sequence of the output unit 172. In particular, the power supply control unit 171 causes the output unit 172 to output a voltage of each of the plurality of power supply channels CH according to the first output voltage 172_OUT at predetermined time intervals and in a predetermined order. In addition, the power supply control unit 171 performs ON/OFF control of the load switch 170. In addition, the power supply control unit 171 has a timer. The power supply control unit 171 uses a timer to measure a rising time T, which will be described later, using a clock signal necessary for operating the load switch 170 and the power supply channels CH1 to CH4.

At the start of power supply from the host 2 to the memory system 1, the power supply control unit 171 controls the output unit 172 so that the output start timing of the first output voltage 172_OUT differs according to the rising speed of the input voltage VIN of the host 2. More specifically, the power supply control unit 171 instructs the output unit 172 to change the output start timing of the first output voltage 172_OUT according to the rising time T for the input voltage VIN to change from the measurement start voltage V0 to the measurement end voltage V1. The output start timing is the timing at which the power supply channel CH set to output power first in the power output sequence starts outputting power. As a result, power can be supplied more appropriately, as will be explained later with reference to FIGS. 3 to 6.

Next, the operation of the memory system 1 when power supply from the host 2 to the memory system 1 is started will be described.

Figure 3:
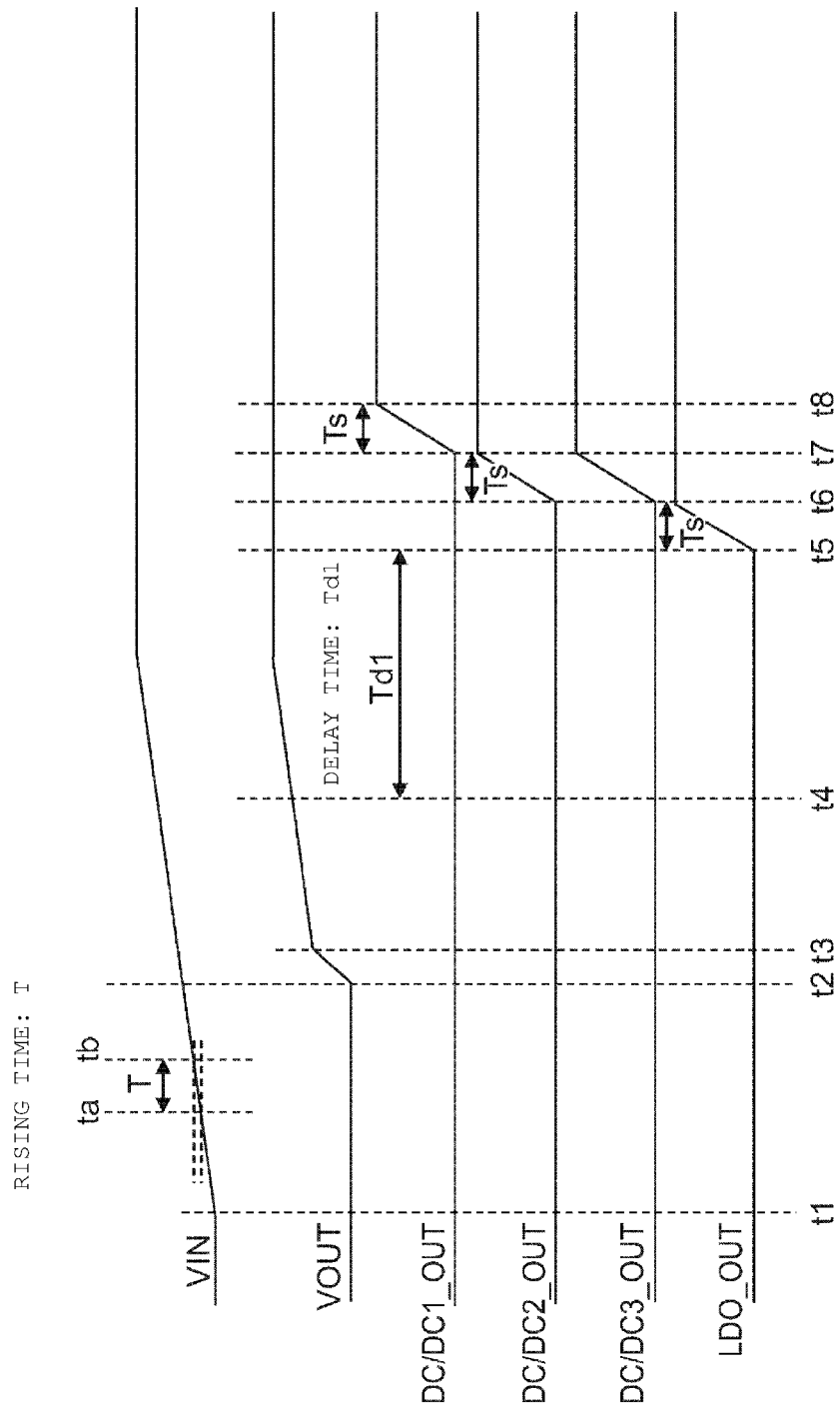
FIG. 3 is a timing chart showing an example of an operation of a memory system according to the first embodiment.

FIG. 3 is a timing chart showing an example of the operation of the memory system 1 according to the first embodiment. FIG. 3 shows an example of the operation of the memory system 1 when it is connected to the host 2 that performs a soft start operation. The soft start operation is an operation of gradually increasing the power output and supplying power to avoid a rush current when power is supplied from the host 2 to the memory system 1.

Figure 4:
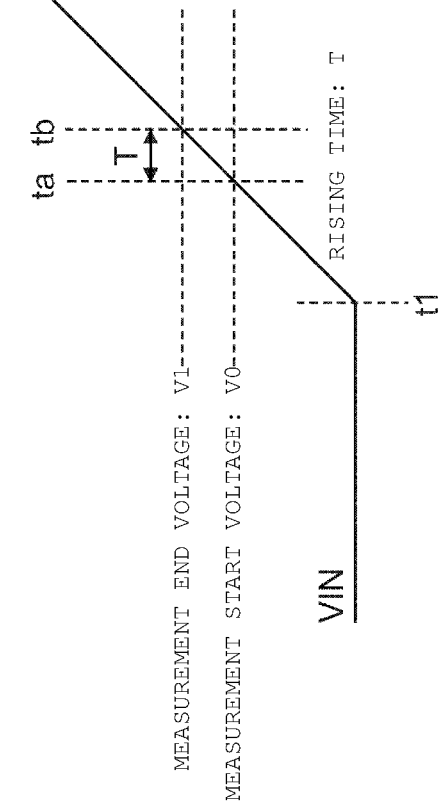
FIG. 4 is a diagram showing an example of a rising time measuring method for determining a delay time according to the first embodiment.

FIG. 4 is a diagram showing an example of a rising time measuring method for determining a delay time Td according to the first embodiment. FIG. 4 is an enlarged diagram of the input voltage VIN from a time ta to a time tb shown in FIG. 3.

Referring to FIG. 3, the host 2 starts supplying power to the memory system 1, a current is supplied from the host power supply unit 4 to the input 170*i* of the load switch 170. At the time t1, the input voltage VIN starts to rise (increases).

Referring to FIGS. 3 and 4, at the time ta, the input voltage VIN reaches the measurement start voltage V0. The measurement start voltage V0 is, for example, 2V. The power supply control unit 171 starts measuring the rising time T of the input voltage VIN. The rising time T is used to set the delay time Td. The delay time Td is the time from when the second output voltage VOUT reaches the output start reference voltage to when the first output voltage 172_OUT starts to be output. The output start reference voltage is the voltage at which the output unit 172 becomes operable. In the example shown in FIGS. 3 and 4, the delay time Td is a period from the time t4 to the time t5.

Next, at the time tb, the input voltage VIN reaches the measurement end voltage V1. The measurement end voltage V1 is, for example, 2.3V. The power supply control unit 171 ends the measurement of the rising time T and stores the measured rising time T. The measured rising time T is stored, for example, in a memory (not shown) in the power supply IC 17*a*. The memory is, for example, a nonvolatile memory. The memory may also be a volatile memory.

Next, the power supply control unit 171 determines whether the rising time T is equal to or less than a threshold time N. The threshold time N is a value set before shipping the memory system 1. The threshold time N is, for example, 1 ms. In the example of the soft start operation shown in FIGS. 3 and 4, the rising time T is longer than the threshold time N. In this case, the power supply control unit 171 changes the delay time Td to a time longer than the delay time Td. The delay time Td is, for example, the minimum value that can be set as the delay time. The power supply control unit 171 changes the delay time Td to the delay time Td1. The delay time Td1 is, for example, a multiple of the rising time T. As a result, the power supply control unit 171 changes the output start timing of the first output voltage 172_OUT based on the rising time T.

Next, at time t2, the input voltage VIN reaches the output start threshold value. The output start threshold value is a value set in advance, and is a value at which the output of the second output voltage VOUT is started when the value of the input voltage VIN reaches this threshold value. As a result, the power supply control unit 171 controls the load switch 170, and the second output voltage VOUT rises.

Next, at a time t3, the rising speed of the second output voltage VOUT follows the rising speed of the input voltage VIN.

Next, at a time t4, the second output voltage VOUT reaches the output start reference voltage. After the set delay time Td1 has elapsed from the time t4 to time t5, the power supply control unit 171 starts the output power sequence, and instructs the output unit 172 to start outputting. The output unit 172 starts outputting the first output voltage 172_OUT at time t5 after the delay time Td1 has elapsed.

After the time t4 and prior to time t5, the input voltage VIN and the second output voltage VOUT rise completely. The complete rise of the voltage means that the rise of the voltage value has completed and the voltage value becomes a substantially stable value with respect to the elapsed time.

Next, at the time t5, the output unit 172 starts outputting voltage. In other words, the output unit 172 (more specifically, the plurality of power supply channels CH1 to CH4) starts outputting voltages according to the first output voltage 172_OUT at a predetermined time interval Ts and in a predetermined order according to the instruction of the power supply control unit 171, after the delay time Td1 has elapsed. At the time t5, the power supply control unit 171 instructs the LDO to output a voltage, and a third output voltage LDO_OUT rises. The third output voltage LDO_OUT rises completely at a time t6. The third output voltage LDO_OUT is a part of the first output voltage 172_OUT.

Next, at the time t6, the power supply control unit 171 instructs DC/DC2 and DC/DC3 to output voltages, and a fourth output voltage DC/DC2_OUT and a fifth output voltage DC/DC3_OUT rise. The fourth output voltage DC/DC2_OUT and the fifth output voltage DC/DC3_OUT rise completely at a time t7. The fourth output voltage DC/DC2_OUT and the fifth output voltage DC/DC3_OUT are a part of the first output voltage 172_OUT.

Next, at the time t7, the power supply control unit 171 instructs the DC/DC1 to output a voltage, and a sixth output voltage DC/DC1_OUT rises. The sixth output voltage DC/DC1_OUT rises completely at a time t8. The sixth output voltage DC/DC1_OUT is a part of the first output voltage 172_OUT.

As described above, when the soft start operation is performed and the input voltage VIN gradually rises, the output unit 172 can start outputting the first output voltage 172_OUT after the input voltage VIN has sufficiently risen.

Next, the case where the soft start operation is not performed or the soft start operation duration time is short will be described. The soft start operation duration time is a time from when the soft start operation has begun to when the input voltage VIN rises completely.

Figure 5:
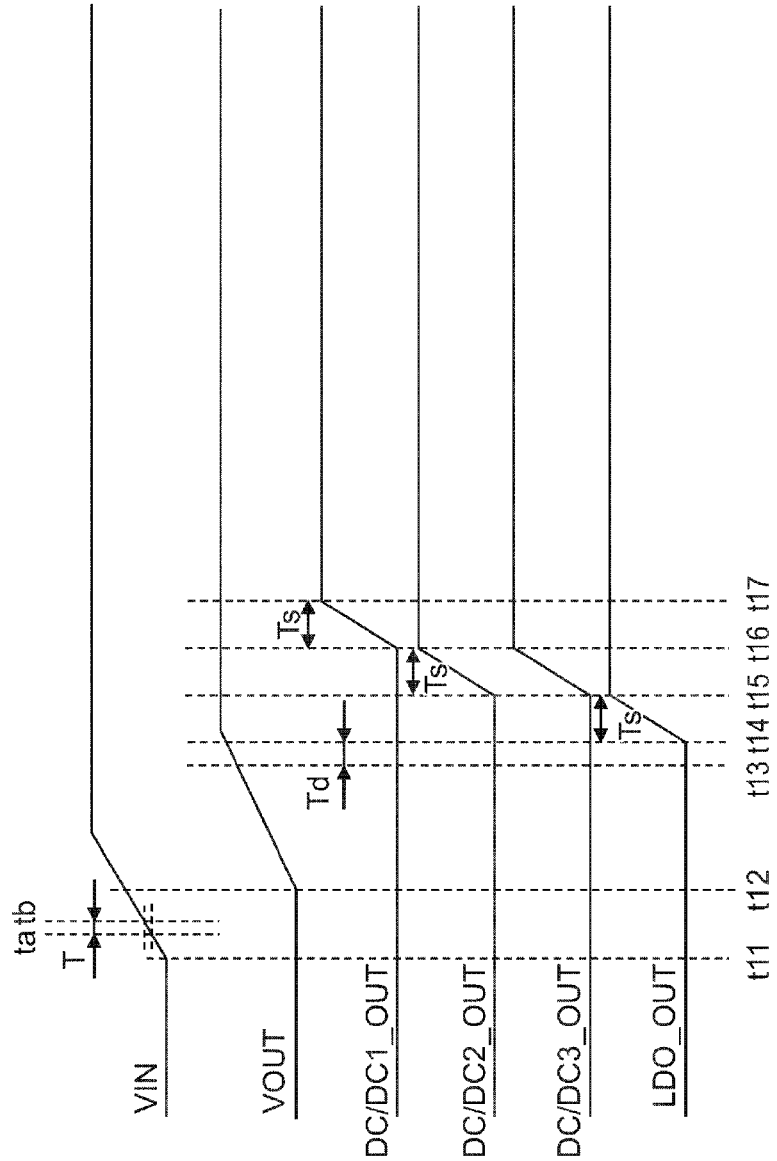
FIG. 5 is a timing chart showing an example of the operation of the memory system according to the first embodiment.

FIG. 5 is a timing chart showing an example of the operation of the memory system 1 according to the first embodiment. FIG. 5 shows an example of the operation of the memory system 1 when connected to the host 2 whose soft start operation duration time is short.

A time t11 to a time t12 shown in FIG. 5 correspond to the time t1 to the time t2 shown in FIG. 3.

In the example in which the soft start operation duration time is short, the input voltage VIN rises sharply compared to the example shown in FIG. 3. Therefore, the rising time T shown in FIG. 5 is shorter than the rising time T shown in FIG. 3.

In the example in which the soft start operation duration time is short, the rising time T is equal to or less than the threshold time N. In this case, the power supply control unit 171 does not change the setting of the delay time Td.

In addition, since the input voltage VIN rises quickly, the second output voltage VOUT that starts rising at the time t12 does not follow the rising of the input voltage VIN. That is, the rising speed of the second output voltage VOUT is slower than that of the input voltage VIN.

After the time t12 and prior to time t13, the input voltage VIN rises completely.

Next, at a time t13, the second output voltage VOUT reaches the output start reference voltage. The power supply control unit 171 instructs the output unit 172 to output a voltage after the delay time Td has elapsed from the time t13 to time t14.

Next, at time t14, the output unit 172 starts outputting the first output voltage 172_OUT. That is, in each of the power supply channels CH1 to CH4, the startup interval, startup order, and the like are the same regardless of whether the delay in the output start timing is changed from Td to Td1. As a result, the output voltages of the respective power supply channels CH1 to CH4 are uniformly delayed. The time t14 to the time t17 shown in FIG. 5 correspond to the time t5 to the time t8 shown in FIG. 3.

As shown in FIG. 5, when the input voltage VIN rises sharply, the output start timing of the first output voltage 172_OUT can be prevented from being delayed more than the minimum. That is, the delay time Td does not need to be lengthened.

As will be described below, it is possible to prevent a voltage drop in the input voltage VIN and the second output voltage VOUT due to a sudden increase in the required current.

Further, the output unit 172 outputs the first output voltage 172_OUT such that the rising speed of the first output voltage 172_OUT is substantially the same for different output start timings. That is, the soft start time of each of the power supply channels CH1 to CH4 is not changed regardless of whether the output start timing is changed. The soft start time of each of the power supply channels CH1 to CH4 is the time from when the output voltage (first output voltage 172_OUT) of each of the power supply channels CH1 to CH4 starts to rise to when the output voltage thereof rises completely. The period from the time t5 to the time t6 shown in FIG. 3 is substantially the same as the period from the time t14 to the time t15 shown in FIG. 5. The period from the time t6 to the time t7 shown in FIG. 3 is substantially the same as the period from the time t15 to the time t16 shown in FIG. 5. The period from the time t7 to the time t8 shown in FIG. 3 is substantially the same as the period from the time t16 to the time t17 shown in FIG. 5.

In addition, FIG. 5 shows a case where the rising speed of the second output voltage VOUT is slower than that of the input voltage VIN. Even when the rising speed of the second output voltage VOUT is faster than that of the input voltage VIN, if the input voltage VIN rises completely when the second output voltage VOUT rises completely, similarly, the power supply control unit 171 does not delay the start of outputting the first output voltage 172_OUT by more than the minimum.

Figure 6:
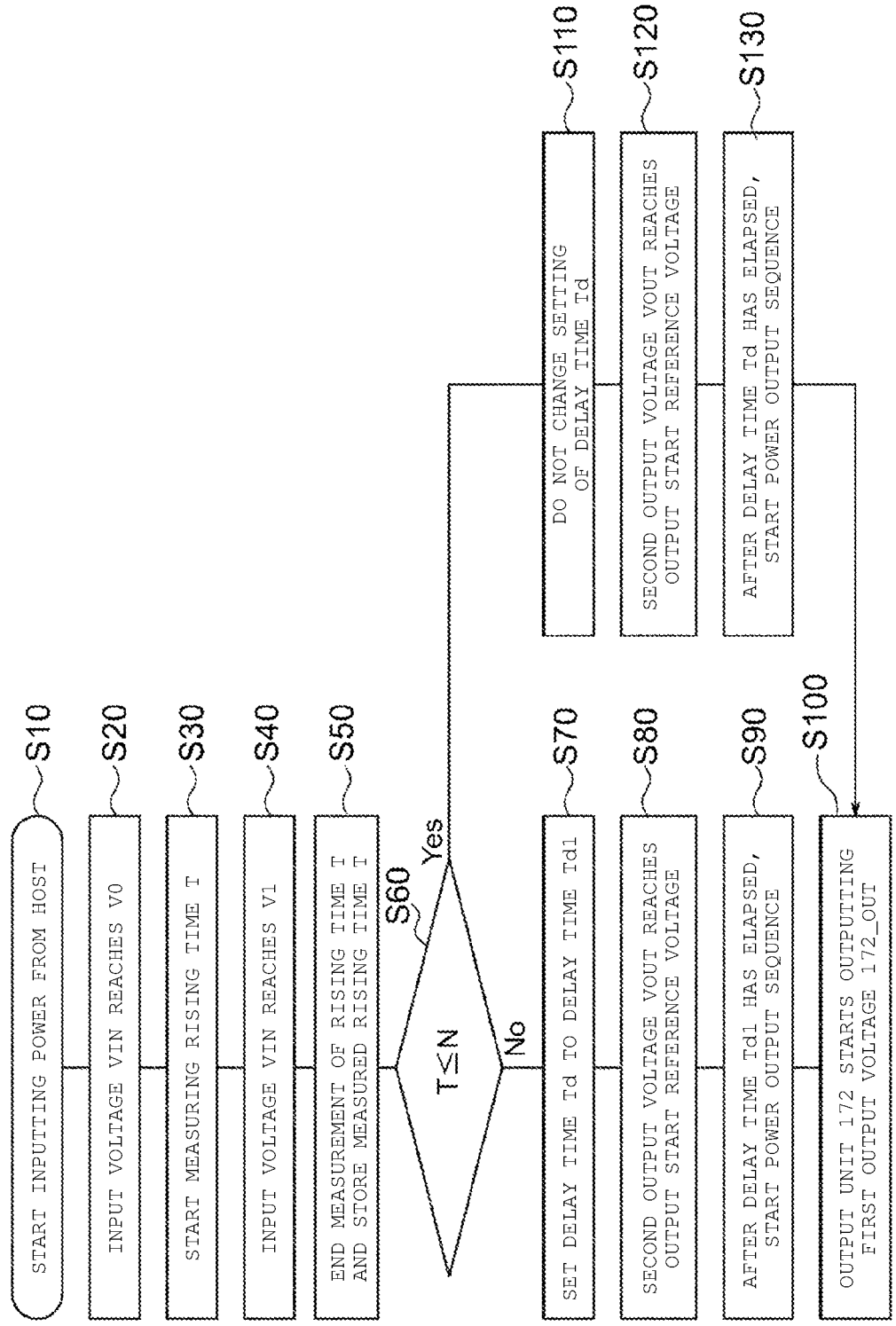
FIG. 6 is a flowchart showing an example of the operation of the memory system according to the first embodiment.

FIG. 6 is a flowchart showing an example of the operation of the memory system 1 according to the first embodiment. First, the host 2 starts inputting and supplying power (S10). When the input voltage VIN reaches the measurement start voltage V0 (S20), the power supply control unit 171 starts measuring the rising time T of the input voltage VIN (S30).

When the input voltage VIN reaches the measurement end voltage V1 (S40), the power supply control unit 171 ends the measurement of the rising time T and stores the measured rising time T in the memory (S50).

Next, the power supply control unit 171 determines whether the rising time T is equal to or less than the threshold time N (S60). If the rising time T is longer than the threshold time N (No in S60), the power supply control unit 171 sets the delay time Td to a delay time Td1 longer than the delay time Td (S70).

When the second output voltage VOUT reaches the output start reference voltage (S80), after the delay time Td1 set in step S70 has elapsed, the power supply control unit 171 starts the power output sequence (S90), and instructs the output unit 172 to start outputting the first output voltage 172_OUT. As a result, the output unit 172 starts outputting the first output voltage 172_OUT (S100).

If the rising time T is equal to or less than the threshold time N (Yes in S60), the power supply control unit 171 does not change the setting of the delay time Td (S110). When the second output voltage VOUT reaches the output start reference voltage (S120), after the delay time Td has elapsed, the power supply control unit 171 starts the power output sequence (S130) and instructs the output unit 172 to start outputting the first output voltage 172_OUT. As a result, the output unit 172 starts outputting the first output voltage 172_OUT (S100).

The timings of the times ta and tb are not limited to the examples shown in FIGS. 3 and 5. The time tb may be any time before the time when the second output voltage VOUT reaches the output start reference voltage.

In addition, the measurement start voltage V0, the measurement end voltage V1, the threshold time N, and the delay times Td and Td1 may be set to other appropriate values.

As described above, according to the first embodiment, the power supply control unit 171 instructs the output unit 172 to delay the start outputting the first output voltage 172_OUT according to the rising time T for the input voltage VIN to change from the measurement start voltage V0 to the measurement end voltage V1. As a result, power can be supplied more appropriately.

More specifically, the power supply control unit 171 sets the output start timing of the first output voltage 172_OUT when the rising time T is longer than the threshold time N to be later than the output start timing of the first output voltage 172_OUT when the rising time T is equal to or less than the threshold time N.

More specifically, when the rising time T is equal to or less than the threshold time N, the power supply control unit 171 starts outputting the first output voltage 172_OUT after the delay time Td after the second output voltage VOUT reaches a predetermined voltage. Further, when the rising time is longer than the threshold time N, the power supply control unit 171 starts outputting the first output voltage 172_OUT after the delay time Td1 after the second output voltage VOUT reaches the predetermined voltage. The delay time Td1 is longer than the delay time Td.

In addition, the power supply circuit 17 starts supplying power at different timings according to the host 2. More specifically, the power supply circuit 17 starts supplying power to each electronic component at different timings according to hosts 2 with different rising speeds of the input voltage VIN, for example, hosts 2 with different lengths of time until the input voltage VIN rises completely. As a result, power can be supplied appropriately to each electronic component regardless of the rising speed of the voltage supplied from the host 2. Depending on the host 2 connected to the memory system 1, the change (delay) of the output start timing may be performed by the host 2. When the connected host 2 is unable to change (delay) the output start timing, the timing of the output start (rising) of the third output voltage LDO_OUT may differ by a predetermined time (for example, 10 ms) or more.

COMPARATIVE EXAMPLE

Figure 7:
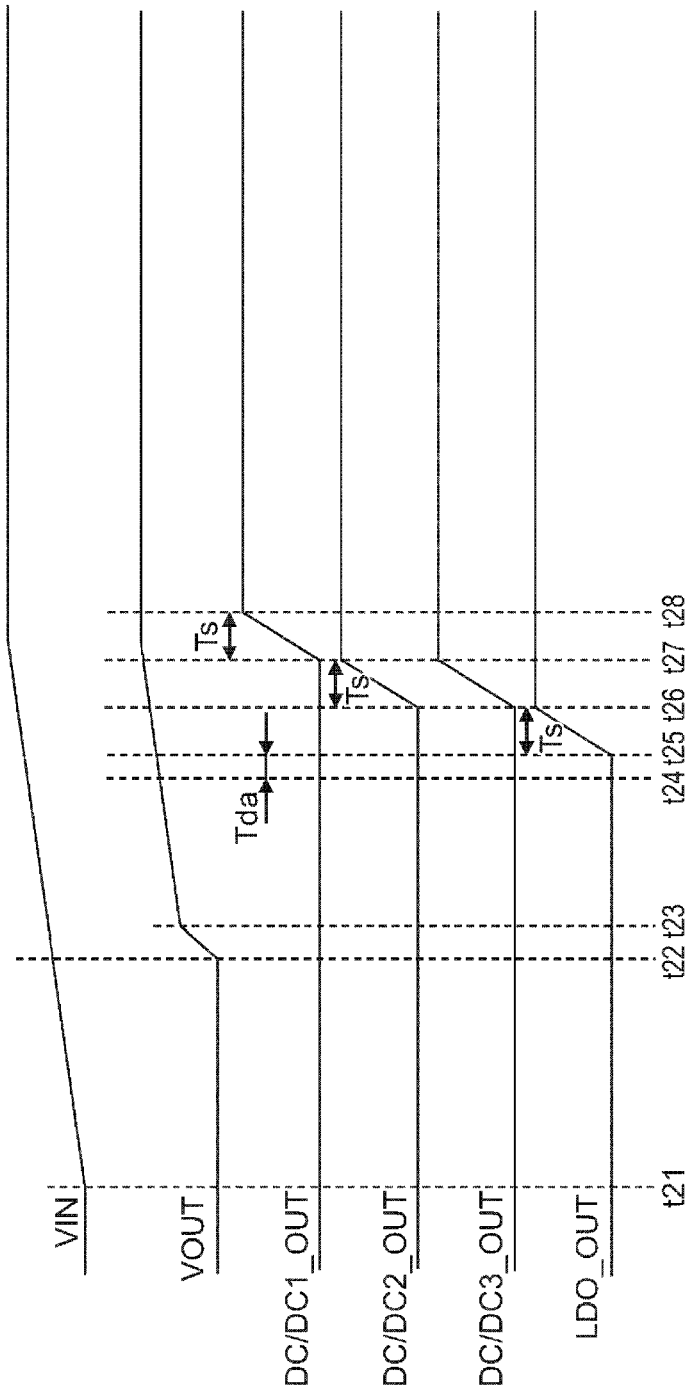
FIG. 7 is a timing chart showing an example of an operation of a memory system according to a comparative example.

FIG. 7 is a timing chart showing an example of the operation of the memory system 1 according to the comparative example. FIG. 7 shows an example of the operation of the memory system 1 when being connected to the host 2 with a long soft start operation duration time. In the comparative example, the delay time is a fixed delay time Tda. The timing chart when being connected to the host 2 that does not perform the soft start operation is substantially the same as in FIG. 5.

In the comparative example, the change in the output start timing is not performed. That is, the delay time Tda is a fixed value. The delay time Tda is set, for example, when the power supply IC 17a is manufactured (before the memory system 1 is shipped). In addition, the delay time Tda is, for example, substantially the same as the delay time Td.

A time t21 to a time t24 shown in FIG. 7 correspond to the time t1 to the time t4 shown in FIG. 3.

When the host 2 having a long soft start operation duration time is connected, the output unit 172 starts supplying the first output voltage 172_OUT before the input voltage VIN is increased completely, that is, before the input voltage VIN is low. In this case, a voltage drop may occur in the input voltage VIN or the second output voltage VOUT. When the voltage drop occurs, for example, the first output voltage 172_OUT may be in an OFF state. When the first output voltage 172_OUT is in the OFF state, the input voltage VIN may be necessary to be dropped to near zero volts and then increased up again. Further, for example, the voltage drop of the second output voltage VOUT may be repeated and fluctuated while the first output voltage 172_OUT is rising (that is, the first output voltage 172_OUT may fluctuate frequently in a short period of time).

On the other hand, in the first embodiment, when the host 2 with a long soft start operation duration time is connected, the power supply control unit 171 delays the output start timing of the first output voltage 172_OUT. As a result, the supply of the first output voltage 172_OUT is started after the input voltage VIN becomes sufficiently high. As a result, even if a voltage drop occurs, since the voltage difference up to the threshold value at which the output of the first output voltage 172_OUT is stopped is large, it is possible to prevent the output of the first output voltage 172_OUT from stopping and On/Off of the first output voltage 172_OUT from being repeatedly fluctuated. As a result, power can be supplied more appropriately.

Second Embodiment

Figure 8:
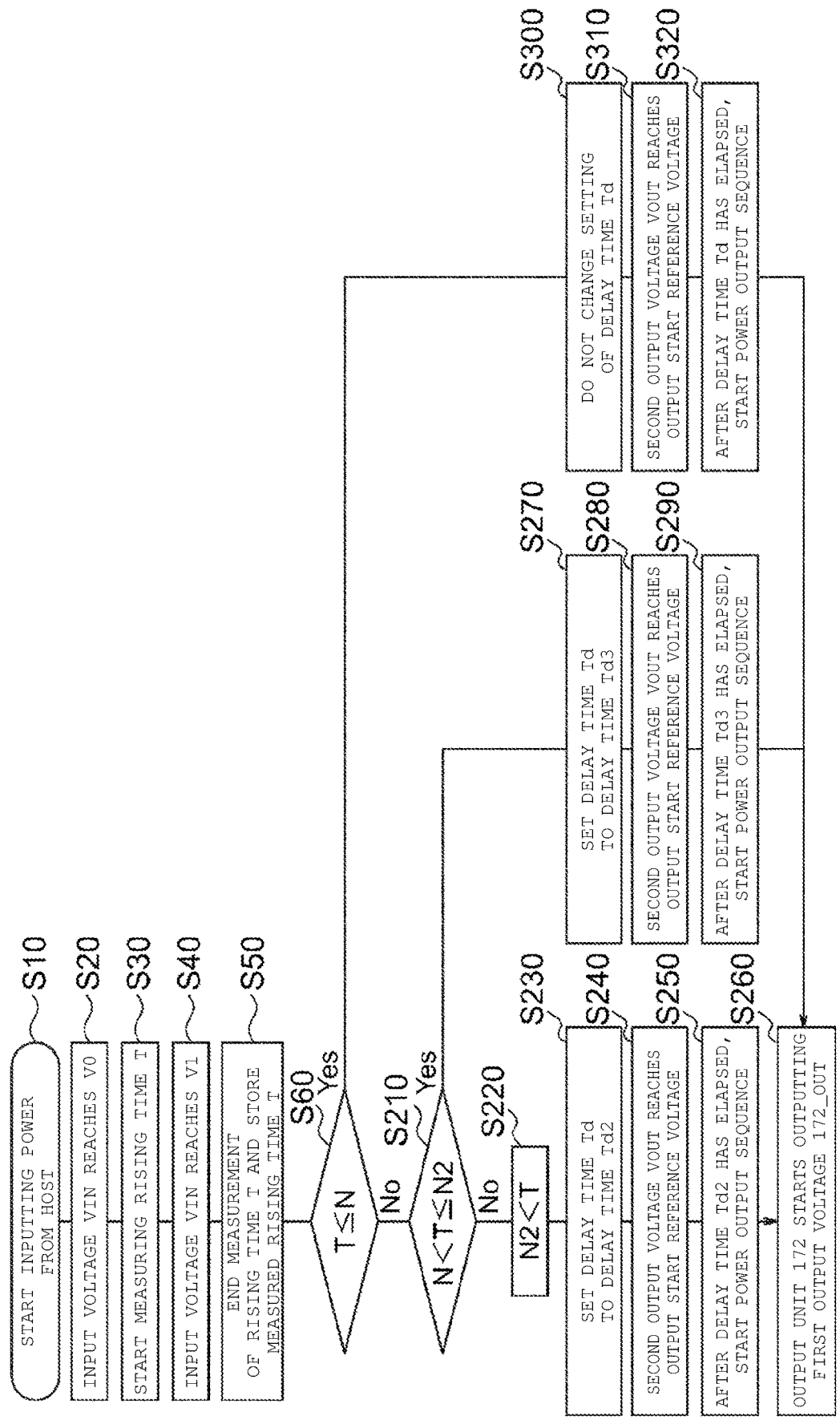
FIG. 8 is a flowchart showing an example of an operation of a memory system according to a second embodiment.

FIG. 8 is a flowchart showing an example of the operation of the memory system 1 according to a second embodiment. The second embodiment differs from the first embodiment in the method of determining the delay time Td.

The power supply control unit 171 changes the output start timing based on a preset time for each of a plurality of ranges of the rising time T. In the example shown in FIG. 8, different delay times are set in advance for three ranges of T≤N, N<T≤N2, and N2<T. The threshold time N is, for example, 1 ms. The threshold time N2 is, for example, 5 ms.

Steps S10 to S60 shown in FIG. 8 are the same as steps S10 to S60 shown in FIG. 6.

If the rising time T is longer than the threshold time N (No in S60), the power supply control unit 171 determines whether the rising time T is longer than the threshold time N and equal to or less than the threshold time N2 (S210). If the rising time T is longer than the threshold time N2 (No in S210, S220), the power supply control unit 171 sets, for example, the delay time Td to the delay time Td2 (S230). The delay time Td2 is longer than the delay time Td.

When the second output voltage VOUT reaches the output start reference voltage (S240), the power supply control unit 171 starts the power output sequence after the delay time Td2 set in step S230 has elapsed (S250), and instructs the output unit 172 to start outputting the first output voltage 172_OUT. As a result, the output unit 172 starts outputting the first output voltage 172_OUT (S260).

If the rising time T is longer than the threshold time N and equal to or less than the threshold time N2 (Yes in S210), the power supply control unit 171 sets, for example, the delay time Td to the delay time Td3 (S270). The delay time Td3 is longer than the delay time Td and shorter than the delay time Td2.

When the second output voltage VOUT reaches the output start reference voltage (S280), the power supply control unit 171 starts the power output sequence after the delay time Td3 set in step S270 has elapsed (S290), and instructs the output unit 172 to start outputting the first output voltage 172_OUT. As a result, the output unit 172 starts outputting the first output voltage 172_OUT (S260).

If the rising time T is equal to or less than the threshold time N (Yes in S60), the power supply control unit 171 does not change the setting of the delay time Td (S300).

When the second output voltage VOUT reaches the output start reference voltage (S310), the power supply control unit 171 starts the power output sequence after the delay time Td has elapsed (S320), and instructs the output unit 172 to start outputting the first output voltage 172_OUT. As a result, the output unit 172 starts outputting the first output voltage 172_OUT (S260).

In the example shown in FIG. 8, the rising time T is divided into three time ranges in steps S60, S210, and S220. However, the number of time ranges may be greater than three.

In addition, the measurement start voltage V0, the measurement end voltage V1, the threshold times N and N2, the delay times Td, Td3, and Td2, and the like are not limited to the example shown in FIG. 8, and may be set to other appropriate values.

The memory system 1 according to the second embodiment further finely sets the delay time according to the rising time T and delays the start of outputting the first output voltage 172_OUT. As a result, power can be supplied more appropriately. The memory system 1 according to the second embodiment can obtain effects similar to or greater than those of the first embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A power supply circuit comprising:
   an input circuit configured to receive a supply of an input voltage;
   an output circuit configured to output at least one first output voltage based on the input voltage; and
   a power supply control circuit configured to control the output circuit so as to change an output start timing of the first output voltage according to a length of a time period during which the input voltage changes from a first voltage to a second voltage.

2. The power supply circuit according to claim 1, wherein the power supply control circuit is configured to set the output start timing when the time period is longer than a reference time period to be later than the output start timing when the time period is equal to or shorter than the reference time period.

3. The power supply circuit according to claim 2, wherein the input circuit is configured to output an interim output voltage and the output circuit is configured to receive a supply of the interim output voltage from the input circuit and output the first output voltage based on the interim output voltage.

4. The power supply circuit according to claim 3, wherein the power supply control circuit is configured to:
   start outputting the first output voltage after a first delay time has elapsed after the interim output voltage reaches a threshold level, when the time period is equal to or shorter than the reference time period, and
   start outputting the first output voltage after a second delay time that is longer than the first delay time has elapsed after the interim output voltage reaches the threshold level, when the time period is longer than the reference time period.

5. The power supply circuit according to claim 1, wherein the output circuit has a plurality of channels, each of which is configured to start outputting respective voltages at predetermined time intervals and in a predetermined order.

6. The power supply circuit according to claim 1, wherein the power supply control circuit is configured to delay the output start timing of the first output voltage from a reference start time by at least a minimum delay time, and change the output start timing of the first output voltage by setting a delay time to be greater than the minimum delay time.

7. The power supply circuit according to claim 6, wherein the power supply control circuit is configured to change the output start timing by setting the delay time to be greater than the minimum delay time by an integer multiple of the length of the time period.

8. The power supply circuit according to claim 7, wherein the output circuit has a plurality of channels, each of which is configured to start outputting respective voltages at predetermined time intervals and in a predetermined order, when the time period is equal to or shorter than a reference time period, and at the predetermined time intervals and in the predetermined order when the time period is longer than the reference time period.

9. The power supply circuit according to claim 7, wherein the power supply control circuit is configured to compare the time period with a plurality of threshold time periods, and change the output start timing by setting the delay time to be one of a plurality of preset delay times according to the comparison results.

10. The power supply circuit according to claim 6, wherein
   the reference start time is a time at which an interim voltage output from the input circuit reaches a threshold level, and
   the power supply control circuit is configured to change the output start timing of the first output voltage by setting the delay time to be equal to a first delay time longer than the minimum delay time when the time period is longer than a first reference time period and equal to or shorter than a second reference time period, and to a second delay time longer than the first delay time when the time period is longer than the second reference time period.

11. The power supply circuit according to claim 10, wherein
   the output circuit has a plurality of channels, each of which is configured to start outputting respective voltages at predetermined time intervals and in a predetermined order, when the time period is equal to or shorter than the first reference time period, at the predetermined time intervals and in the predetermined order when the time period is longer than the first reference time period and equal to or shorter than the second reference time period, and at the predetermined time intervals and in the predetermined order when the time period is longer than the second reference time period.

12. A memory system connectable to a host, comprising:
   a nonvolatile memory;
   a controller configured to control the nonvolatile memory; and
   a power supply circuit configured to supply power to the nonvolatile memory and the controller, wherein the power supply circuit includes
   an input circuit configured to receive a supply of an input voltage from the host,
   an output circuit configured to output at least one first output voltage based on the input voltage, and
   a power supply control circuit configured to control the output circuit so as to change an output start timing of the first output voltage according to a length of a time period during which the input voltage changes from a first voltage to a second voltage.

13. The memory system according to claim 12, wherein the output circuit includes
 a first channel configured to output the first output voltage to the nonvolatile memory, and
 a second channel configured to output the first output voltage to the controller.

14. The memory system according to claim 12, wherein the power supply control circuit is configured to delay the output start timing of the first output voltage from a reference start time by at least a minimum delay time, and change the output start timing of the first output voltage by setting a delay time to be greater than the minimum delay time.

15. The memory system according to claim 12, wherein the output circuit has a plurality of channels, each of which is configured to start outputting respective voltages at predetermined time intervals and in a predetermined order, when the time period is equal to or shorter than a reference time period, and at the predetermined time intervals and in the predetermined order when the time period is longer than the reference time period.

16. A power supply control circuit connectable to a plurality of hosts, comprising:
 an input circuit configured to receive a supply of an input voltage from at least one of the plurality of hosts;
 an output circuit configured to output a first output voltage based on the input voltage; and
 a first channel from which the first output voltage is supplied,
 wherein an output start time of the first output voltage is set according to a start time during which the input voltage supplied from one of the hosts changes from a first voltage to a second voltage,
 the plurality of hosts include a first host of which the start time is a first time and a second host of which the start time is a second time that is different from the first time,
 when the first host is connected, the first output voltage is supplied from the first channel after a first delay time has elapsed, and
 when the second host is connected, the first output voltage is supplied from the first channel after a second delay time that is different from the first delay time has elapsed.

17. The power supply control circuit according to claim 16, wherein
 the first time is longer than the second time, and
 the first delay time is longer than the second delay time.

18. The power supply control circuit according to claim 16, further comprising:
 a second channel from which the first output voltage is supplied,
 wherein when the first host is connected, the first output voltage is supplied from the second channel after a third time has elapsed after the first output voltage is supplied from the first channel, and
 when the second host is connected, the first output voltage is supplied from the second channel after the third time has elapsed after the first output voltage is supplied from the first channel.

19. The power supply control circuit according to claim 18, further comprising:
 a third channel from which the first output voltage is supplied,
 wherein when the first host is connected, the first output voltage is supplied from the third channel after the third time has elapsed after the first output voltage is supplied from the second channel, and
 when the second host is connected, the first output voltage is supplied from the second channel after the third time has elapsed after the first output voltage is supplied from the third channel.

20. The power supply control circuit according to claim 16, wherein
 the first delay time is set according to a length of the first time and the second delay time is set according to a length of the second time.

* * * * *